(12) United States Patent
Duffy, III et al.

(10) Patent No.: US 7,561,060 B2
(45) Date of Patent: Jul. 14, 2009

(54) ELECTROLUMINESCENT DATA CABLE IDENTIFICATION AND COMPUTER SYSTEM DIAGNOSTICS

(75) Inventors: William R. Duffy, III, Raleigh, NC (US); Tony Carl Sass, Fuquay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 11/560,701

(22) Filed: Nov. 16, 2006

(65) Prior Publication Data

US 2008/0115957 A1 May 22, 2008

(51) Int. Cl.
*G08B 3/00* (2006.01)
(52) U.S. Cl. .................. 340/691.1; 340/691.8; 439/403
(58) Field of Classification Search .............. 340/691.1, 340/691.8, 635, 641, 643, 815.4; 381/384, 381/124, 172; 439/403, 402, 581
See application file for complete search history.

(56) References Cited

U.S. PATENT DOCUMENTS

| | | | |
|---|---|---|---|
| 5,666,453 A | 9/1997 | Dannenmann | |
| 5,764,043 A | 6/1998 | Czosnowski et al. | |
| 6,848,947 B2 * | 2/2005 | Chimiak | 439/638 |
| 6,867,376 B2 | 3/2005 | Sawyer et al. | |
| 6,932,639 B2 * | 8/2005 | Woodruff | 439/403 |
| 2003/0152344 A1 | 8/2003 | Brunet et al. | |
| 2004/0145313 A1 | 7/2004 | He | |
| 2004/0164683 A1 * | 8/2004 | Bettis | 315/169.3 |
| 2005/0074223 A1 | 4/2005 | Moore | |
| 2007/0019821 A1 * | 1/2007 | Dudley | 381/77 |

* cited by examiner

*Primary Examiner*—Van T. Trieu
(74) *Attorney, Agent, or Firm*—Cynthia G. Seal; Jeffrey L. Streets (57) ABSTRACT

Cable identification and computer system diagnostics are facilitated with electroluminescent technology. In one embodiment, a computer data cable includes an electroluminescent strand having a first wire with an electroluminescent coating and a second wire in contact with the inner wire. An AC voltage is applied between the inner and outer wire to selectively illuminate the electroluminescent strand in response to predetermined conditions, such as in response to the detection of a connection-related fault or in response to plugging in the data cable to a device port. Diagnostic techniques such as FMEA may be implemented in software for detecting connection faults and selectively illuminating the data cables in response.

15 Claims, 5 Drawing Sheets

ELECTROLUMINESCENT DATA CABLE IDENTIFICATION AND COMPUTER SYSTEM DIAGNOSTICS

BACKGROUND OF THE INVENTION

1. Field of the Invention

The present invention relates both to the visual identification of data cables and the diagnosis of connection faults in computer systems.

2. Description of the Related Art

Computer systems typically include multiple electronic components interconnected with cables. In a rack-based server system, for example, multiple servers and other devices may be interconnected to achieve scalability. Each server or other device to be interconnected generally includes a plurality of connection ports. Data cables are typically used to connect the connection ports of one server with the connection ports of another server. Still, a variety of faults may occur with such connections. Examples of faults include an "open pin" condition, an unexpectedly large voltage or temperature rise, or a data transmission error. The occurrence of a fault is particularly likely where multiple connections are involved. For example, rack-based server systems typically include multiple servers, each having multiple connection ports. Many data cables may be required to interconnect the servers. Troubleshooting the connections in such computer systems can therefore be challenging.

Conventional diagnostic systems include software and hardware for performing failure mode and effects analysis (FMEA). However, conventional diagnostic systems are not without some disadvantages. For example, individually identifying a faulty data cable, connection, or connection port can be difficult where numerous data cables are closely grouped. One conventional way of identifying data cables includes passively color coding their cable housings prior to use. However, color coding is limited to the relatively few colors that can be easily distinguished by the human eye. The color of cable housings may also be difficult to discern in dim lighting, which is common when cables are routed behind or between equipment. Another conventional way to identify cables is with the use of LEDs positioned on or near the connection ports. The LEDs may light up to indicate the source or location of a problem port, cable, or connection. Still, the LEDs on the ends of a cable do not allow a user to see the entire path of the cable routing and a user's view of the ends of the cable may be obscured by a server rack, component chassis, or other structure.

In view of the above problems and limitations with conventional computer data cables and diagnostic systems, improved methods and devices are desired in order to facilitate the identification of data cables used with computer systems and to troubleshoot connections between cables and devices. An easier, more reliable way to identify and distinguish data cables is desired, particularly in computer installations with numerous bundled cables, poor lighting conditions, and/or structural impediments that obscure a full view of cables and connections. An improved cable identification system would preferably be compatible with aspects of existing FMEA software and other diagnostic tools. The improved system would also preferably avoid interference with data signals carried by the data cables.

SUMMARY OF THE INVENTION

The present invention includes methods and systems for providing improved cable identification and diagnostic capabilities in computer systems. In a first embodiment, an apparatus comprises a data cable having a first electronic connector with a first set of electronic terminals and a second electronic connector with a second set of electronic terminals. A plurality of signal wires are provided for electronically coupling the first set of electronic terminals with the second set of electronic terminals. An electroluminescent strand extends along the data cable between the first and second electronic connectors. The electroluminescent strand includes a first wire, an electroluminescent coating on the first wire, and a second wire adjacent the first wire. The electroluminescent coating is illuminable in response to an AC voltage between the first and second wires.

A second embodiment is a diagnostic system. A first electronic component has a first plurality of electronic connection ports, and a second electronic component has a second plurality of electronic connection ports. A plurality of electronic data cables provides electronic communication between the first and second electronic components. Each electronic data cable has a first electronic connector removably connected to one of the first plurality of electronic connection ports, a second electronic connector removably connected to one of the second plurality of electronic connection ports, a plurality of signal wires are disposed in a data cable housing for providing electronic communication between the first and second connection ports, and an electroluminescent strand. An AC voltage source is electronically coupled to the electroluminescent strand for selectively illuminating the electroluminescent strand. A controller is in electronic communication with the AC voltage source and the electronic connection ports. The controller detects failure modes associated with one or more of the electronic connection ports and selectively illuminates the electroluminescent strands in response to the detected failure modes.

In a third embodiment, a computer program product comprises a computer usable medium including computer usable program code for troubleshooting connections of a computer system. The computer program product includes computer usable program code. Computer usable program code is provided for electronically monitoring a plurality of connection ports included with the computer system. Computer usable program code is provided for detecting a fault associated with one or more of the connection ports configured for removably connecting to a data cable, wherein the data cable includes an electroluminescent strand having a first wire with an electroluminescent coating and a second wire in contact with the first wire. Computer usable program code is provided for selectively applying an AC voltage between the first wire and the second wire to illuminate the electroluminescent coating in response to the detected fault.

DETAILED DESCRIPTION OF PREFERRED EMBODIMENTS

The present invention utilizes electroluminescence technology to provide improved diagnostics and cable identification in computer system connections. In one embodiment, a data cable for data communication between two electronic devices includes an electroluminescent (EL) strand or cable along its length. The EL strand may be attached to the outer side of the data cable housing, or routed inside a transparent or translucent data cable housing. An electronically insulating material disposed within the cable housing for insulating between the plurality of wires and the electroluminescent strand may be selected from an aluminum foil, mylar foil, tinned copper braid, and combinations thereof. The data cable typically has a first connector at one end for plugging into a mating connector on a first electronic device, such as a first server, and a second connector at the other end for plugging into a mating connector on a second electronic device, such as a second server. The first and second electronic connectors may be of a connector type selected from the group consisting of Ethernet. RS-232, video, keyboard/mouse, USB, Infiniband, SAS, SATA, SCSI, and Firewire.

The EL strand includes a first electronically conductive wire having an EL coating and a second electronically conductive wire in contact with EL coating on the first wire, such that the EL coating illuminates in response to an AC voltage applied between the first and second wires. An AC voltage source may be included with the first or second electronic device, such that the EL strand illuminates when plugged into the first or second device. The EL strand makes the data cable highly visible and easily identifiable, even if a portion of the data cable is obscured. In some embodiments, the data cable may be used in conjunction with existing diagnostic tools to provide enhanced diagnostics and troubleshooting. For example, diagnostic software that conventionally illuminates LEDs at connection ports on the first or second electronic devices, may be adapted to selectively illuminate an electroluminescent data cable according to the invention. Other configurations of data cables and diagnostic systems according to the invention are discussed below with reference to the attached figures.

Figure 1:
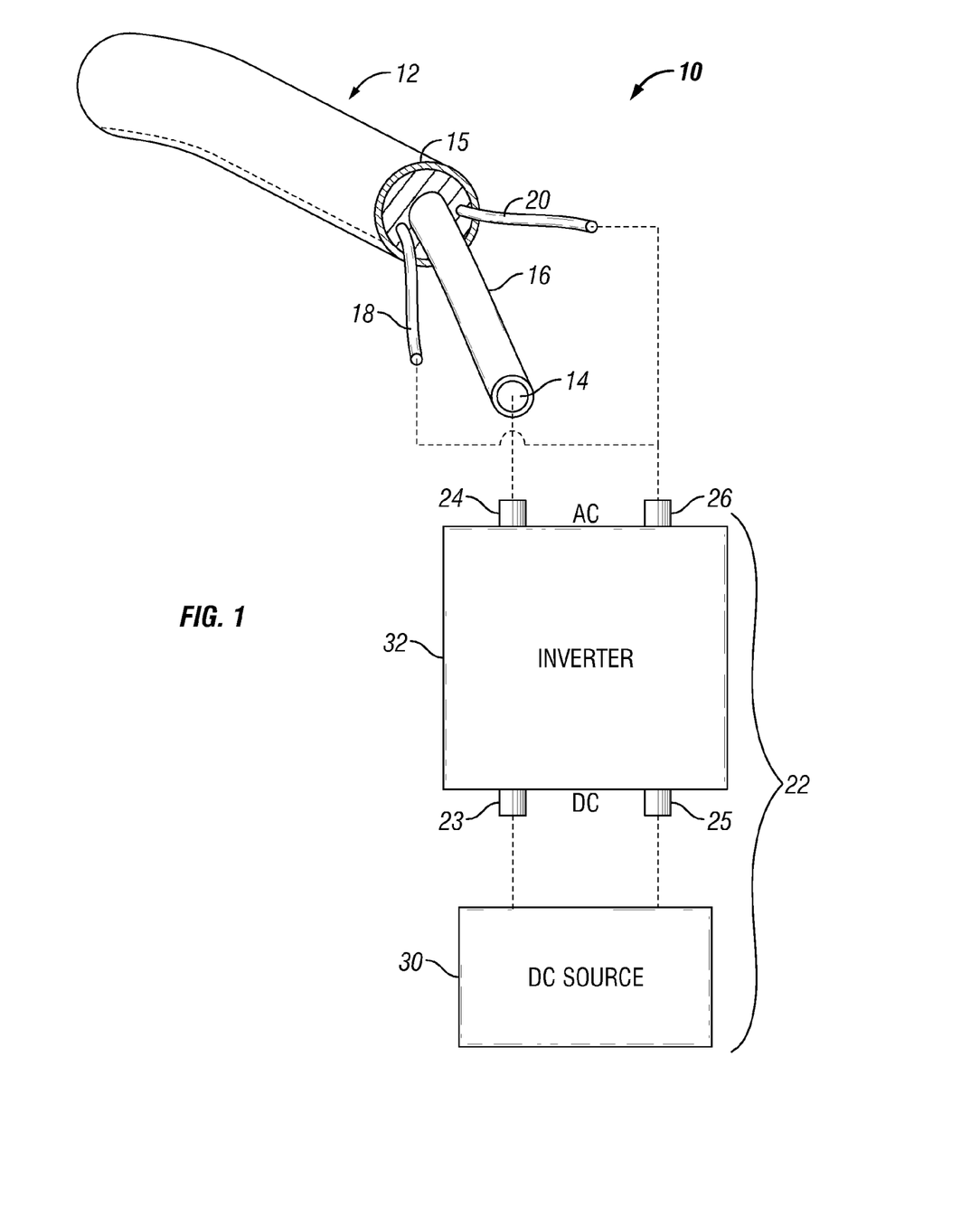
FIG. 1 is a schematic diagram of an electroluminescent device including an electroluminescent ("EL") strand in communication with an AC voltage source for powering the EL strand.

FIG. 1 is a schematic diagram of an electroluminescent device 10 including an electroluminescent ("EL") strand 12 and an AC voltage source 22 for powering the EL strand 12. The EL strand 12 includes a first wire 14, which in this embodiment is an "inner" wire 14 with an EL coating 16 and a second wire, which in this embodiment are two "outer" wires 18, 20 in contact with the inner wire 14. The EL coating may be any of a variety of electroluminescent materials known in the art, such as an "electroluminescent phosphor" that illuminates in response to an AC voltage applied across it. An optional EL strand jacket 15 secures and protects inner components of the EL strand 12 such as the inner wire 14 and outer wires 18, 20. The AC source 22 provides an AC voltage across the EL coating 16 between the inner wire 14 and outer wires 18, 20.

A variety of AC sources are known in the art. In the embodiment of FIG. 1, the AC source 22 includes a DC source 30 and a DC-to-AC inverter 32. The DC source 30 supplied two DC inputs 23, 25 (one source and one ground) on the inverter 32. The inverter 32 converts the DC signals to high frequency AC at first and second output terminals 24, 26. The first output terminal 24 is electronically coupled to the inner wire 14, and the second output terminal 26 is electronically coupled to the outer wires 18, 20 to provide the AC voltage across the EL coating 16. The use of more than one outer wire is optional, and in another embodiment a single inner wire with an EL coating and a single outer wire in contact with the inner wire may instead be used to generate an AC voltage across the EL coating 16. Typically, an AC voltage of between 100 and 200 AC volts RMS (root means squared) is used, at a frequency in the low kilohertz. The brightness of the emitted light depends on the frequency, and the frequency of the AC source 22 may be adjustable to vary the brightness of emitted light.

The EL strand jacket 15 is made of a material through which visible light may pass, such as a transparent or translucent polymer, so that light emitted by the EL coating passes through the jacket 15 and is visible to a user. The EL strand jacket 15 may also be provided in a variety of colors so that the different EL strands may be distinguishable by the color of light emitted. The EL strand 12 may optionally include a colored or colorless, translucent or transparent coating. Different types of EL coatings 16 known in the art may also be used to cause different colors to be emitted in response to an applied AC voltage.

The AC source 22 may be used to selectively control the illumination of the EL strand 12. For example, blinking patterns may be generated by repeatedly turning the AC voltage on and off. The frequency of the AC voltage, when turned on, may be controlled to control brightness or intensity of light emitted by the strand. The AC voltage may be applied temporarily, such as for a short period after a data cable is plugged into a device, to provide a visual confirmation to the user that the data cable was properly plugged in. Various other patterns and signals may be devised within the scope of the invention.

Figure 2:
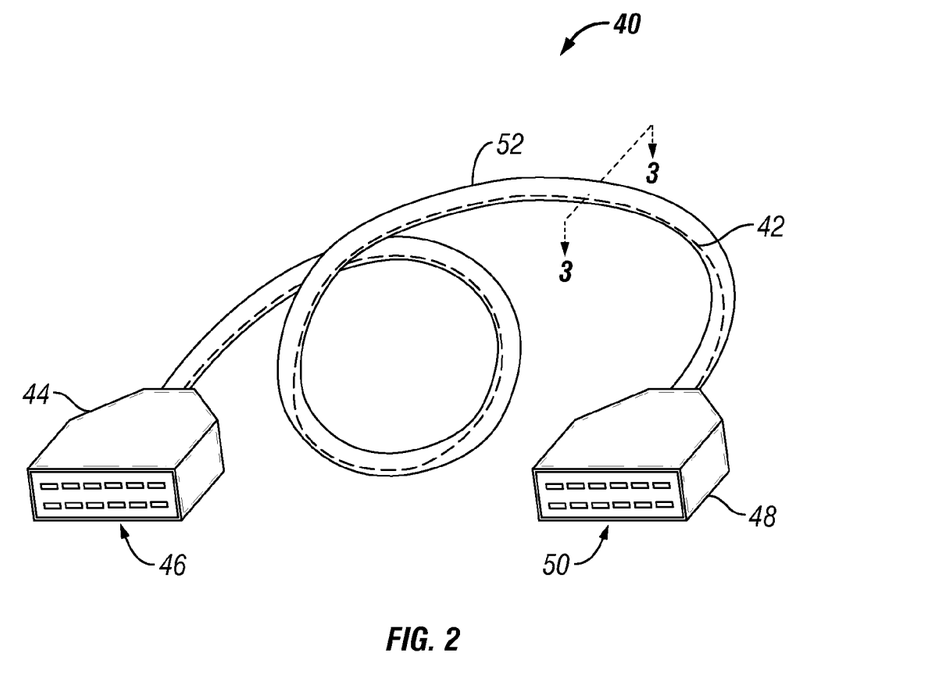
FIG. 2 is a perspective view of a data cable adapted to include the EL strand of FIG. 1.

FIG. 2 is a data cable 40 that is adapted to include the EL strand 12 of FIG. 1. The data cable 40 includes a first electronic connector 44 having a first set of electronic terminals 46 and a second electronic connector 48 having a second set of electronic terminals 50. The first and second electronic connectors 44, 48 may be of a connector type selected horn the group consisting of Ethernet, RS-232, video, keyboard/mouse, USB, Infiniband, SAS, SATA, SCSI, and Firewire. A plurality of signal wires (not shown) are routed within a data cable housing 52 of the data cable 40 from the first set of electronic terminals 46 to the second set of electronic terminals 50. A dashed line 42 indicates a mounting location for routing the EL strand 12 of FIG. 1 along the data cable 40 between the first and second electronic connectors 44, 46. The EL strand 12 may be routed externally (see FIG. 3A) or internally (see FIG. 3B).

Figure 3A:
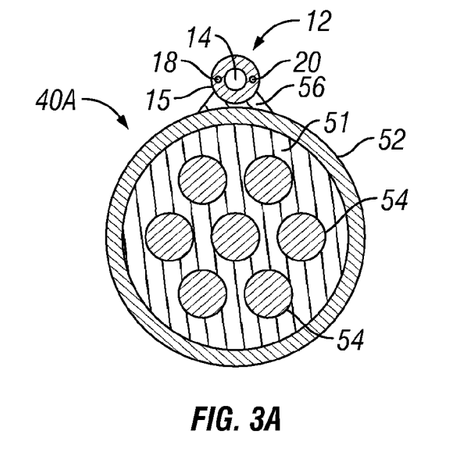
FIG. 3A is a cross-sectional view of one configuration of the data cable taken along section 3-3 of FIG. 2, with the EL strand mounted externally to the data cable housing.

FIG. 3A is a cross-sectional view of one configuration of a data cable 40A taken along section 3-3 of FIG. 2, with the EL strand 12 mounted externally to the data cable housing 52. A plurality of signal wires 54 are encased by the data cable housing 52 and electronically couple the electronic terminals 46, 50 (FIG. 2). A protective core material 51 is disposed within the data cable housing 52, which separates, insulates, and protects the individual signal wires 54. The EL strand 12 may be secured externally to the data cable housing 52 with an adhesive or bonding material 56 between the EL strand jacket 15 and the data cable housing 52. Alternatively, the EL strand 12 and data cable housing 52 may be molded together or otherwise joined by means known in the art for mechanically joining two cables or wires.

One advantage of the configuration of the data cable 40A is that the EL strand 12 and its wires 14, 18, 20 are well insulated and electronically shielded from the signal wires 54. An electronically insulating material disposed within the cable housing 52 for insulating between the plurality of wires and the electroluminescent strand may be selected from an aluminum foil, mylar foil, tinned copper braid, and combinations thereof. The data cable housing 52, EL strand jacket 15, and protective material 51 provide redundant barriers for shielding, insulating, and otherwise protecting the components of the data cable 40A. It should be noted, however, that even without redundant layers of protection, the EL strand 12 typically does not interfere appreciably with signals transmitted along the signal wires 54. Another advantage of the externally-routed embodiment of the data cable 40A is that prefabricated sections of EL strand may be attached to the data cable housing 52, to simplify the manufacturing of the data cable 40A. Furthermore, the EL strand may be directly visible from a greater range of angles by virtue of its external position.

Figure 3B:
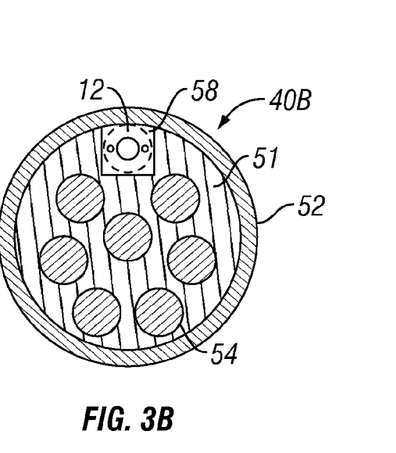
FIG. 3B is a cross-sectional view of an alternative configuration of a data cable taken along section 3-3 of FIG. 2, with the EL strand routed internally to the data cable housing.

FIG. 3B is a cross-sectional view of an alternative configuration of a data cable 40B taken along section 3-3 of FIG. 2, with the EL strand 12 routed internally to the data cable housing 52. In this configuration, the housing must be transparent or translucent. An optional pocket 58 is optionally provided in the core material 51 for receiving the EL strand 12. The pocket 58 is particularly appropriate in combination with a pre-fabricated section of EL strand 12, which may simply be laid into the pocket 58 before encasing the data cable 40B with the data cable housing 52. Alternatively, the EL strand 12 (with or without the EL strand jacket 15) may be molded directly into the protective core material 51 with no pocket 58, so long as the material 51 is also transparent or translucent. The use of the EL strand jacket 15 is optional, because the protective core material 51 and the data cable housing 52 may sufficiently encase and protect the components of the EL strand 12 in lieu of the EL strand jacket 15.

Figure 4:
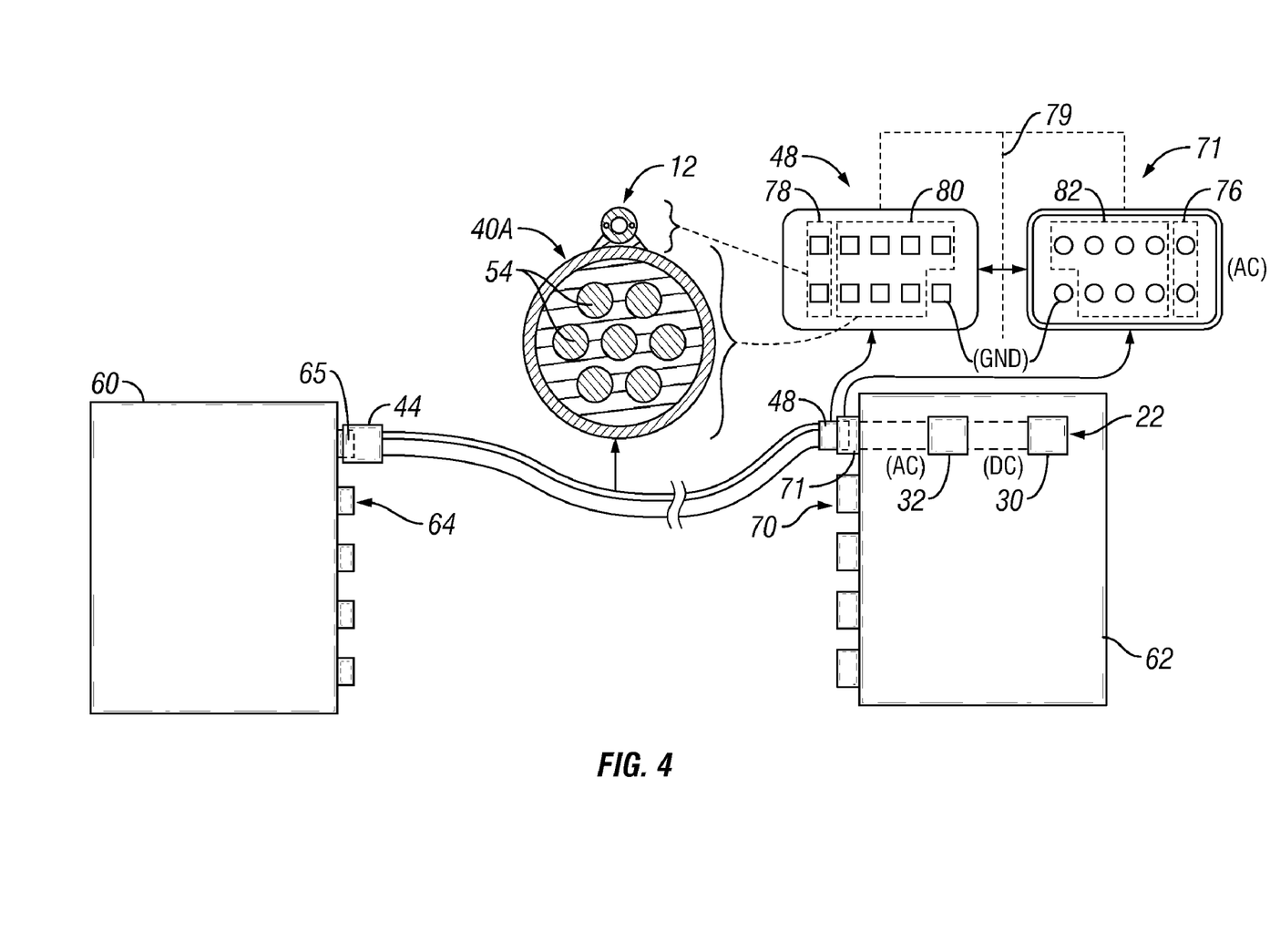
FIG. 4 is a schematic diagram of the data cable "plugged in" to two electronic devices to provide electronic communication between the two electronic devices.

FIG. 4 is a schematic diagram of the data cable 40A "plugged in" to two electronic devices 60, 62 to provide electronic communication between the two electronic devices 60, 62 via a plurality of wires 54 disposed within the data cable 40A. The first electronic device 60 may be a first server 60 having a plurality of connection ports 64. The second electronic device 62 may be a second server 62 having a plurality of connection ports 70. The first electronic connector 44 of the data cable 40A is plugged into a "first" connection port 65 on the first server 60 and the second electronic connector 48 of the data cable 40A is plugged into a "second" connection port 71 on the second server 62. Alternatively, the data cable 40B (FIG. 3B) could be used in place of the data cable 40A (FIG. 3A).

Schematic front views of the connection port 71 and the electronic connector 48 are separately included in FIG. 4 to illustrate the interconnection of their electronic terminals. As shown, the electronic connector 48 could be coupled to the connection port 71 after rotating the connector 48 out of the page around an imaginary line of symmetry 79 therebetween. The AC source 22 is electronically coupled to a pair of terminals 76 on the connection port 71, to provide an AC voltage between the pair of terminals 76. The seven signal wires 54 are electronically coupled to a set of seven electronic terminals 80 in a one-to-one correspondence. With the electronic connector 48 plugged into the connection port 71, the pair of terminals 76 mate with the pair of terminals 78 to provide an AC voltage to the EL strand 12, and the set of terminals 80 mate with a set of terminals 82 to provide data communication between the two servers 60, 62 along the data cable 40A.

The AC source 22 of FIG. 1 is included with the second server 62, though other AC sources known in the art may be adapted for use with the invention. Still referring to FIG. 4, the AC source 22 is connected to the pair of terminals 76 to power the EL strand 12 whenever the electronic connector 48 is plugged in to the connection port 71, regardless of whether the electronic connector 44 on the other end of the data cable 40A is also plugged into the connection port 65.

In another embodiment, an AC source may alternatively be configured so that both ends of a data cable must be plugged in for the EL strand to be illuminable. For example, one of two AC terminals may be connected to a connection port terminal on one device, and the other AC terminal may be connected to a connection port on another device, so that the EL strand only receives the AC voltage required to illuminate the EL strand when both ends of the data cable are plugged in. This alternative embodiment may be useful, for example, to provide a visual confirmation that both ends of the data cable are plugged in. Further alternatives may include, without limitation, the use of an independent battery pack or a reserve capacitor.

Figure 5:
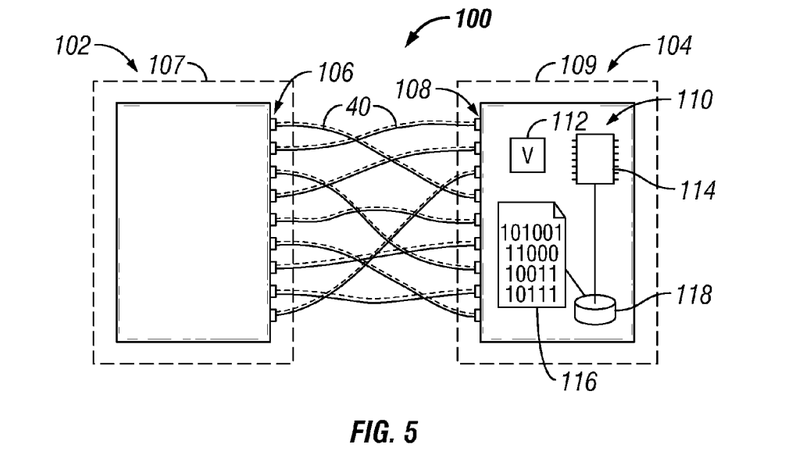
FIG. 5 is a schematic diagram of a computer system including a first electronic device connected to a second electronic device using a plurality of data cables according to the invention.

FIG. 5 is a schematic diagram of a computer system generally indicated at 100 including a first electronic device ("first device") 102 connected to a second electronic device ("second device") 104 using a plurality of data cables 40 (FIG. 2) according to the invention. The first device 102 includes a plurality of connection ports 106 and the second device 104 includes a plurality of connection ports 108. Each data cable 40 may be connected at one end to one of the connection ports 106 and at the other end to one of the connection ports 108. As shown, the connection ports 106 and the connection ports 108 do not necessarily align with each other. When the two devices 102, 104 are connected, the plurality of data cables 40 are somewhat bundled together and, when a cable 40 is not illuminated, it may be difficult to visually discern the full path of the cable 40 between the first and second devices 102, 104. This is particularly true in dim lighting. Visually identifying specific data cables 40 and troubleshooting the cable connections of the computer system 100 are facilitated by the electroluminescent feature of the data cables 40. The data cables 40 may be selectively illuminated according to the invention to identify the selectively illuminated data cables 40 among the non-illuminated data cables 40. The path of one of the data cables 40 between two connection ports, when the data cable 40 is illuminated, is also more easily identified. Because most or all of the length of each data cable 40 may be illuminated, visually identifying an illuminated data cables is possible even when a view of the connection ports 106, 108 is obscured by racks 107 and 109.

One example of a computer connection diagnostic system 110 is schematically shown in conjunction with the second device 104. An AC source 112 is electronically coupled to the electronic connection ports 108 for selectively illuminating the data cables 40. A controller 114 is in electronic communication with the AC source 112 and the connection ports 108 for detecting faults associated with one or more of the connection ports 108 and selectively illuminating the data cables 40 in response. Conventional or known troubleshooting methods may be adapted to include functionality for selectively illuminating the data cables 40 in response to connection-related faults. The methods may be implemented by troubleshooting software 116. The software 116 and other electronic information may be stored on a memory module 118. The memory module 118 may be a hard drive or other long-term storage device, and may include elements of RAM, ROM, flash memory, or combinations thereof. Non-limiting examples of faults detectable by the diagnostic system 110 include an "open pin" condition associated with a faulty electronic terminal, a high or low voltage condition along one of the data cables 40 or connection ports 106, 108, a high temperature along one of the data cables 40 or at one of the connection ports 106, or an activity error. In response to the detection of a fault, the diagnostic system 110 may illuminate the data cable 40 or connection port(s) 106, 108 associated with the fault. An operator may then visually identify the illuminated data cable(s) 40 and take steps to correct the fault(s), such as reseating the connections between the illuminated/faulty cable 40 and the connection ports 106, 108, or repairing or replacing the faulty cable 40. Some faults may cause the EL strand to be non-operational, so that illuminating the cable is not possible for the purpose of visually identifying the faulty connector or data cable. To account for this contingency, an optional "test mode" may be provided, wherein all of the connections are simultaneously illuminated, so that the properly functioning data cables 40 connected to properly function ports illuminate, while any malfunctioning connectors or data cables may be identified by their failure to illuminate.

Figure 6:
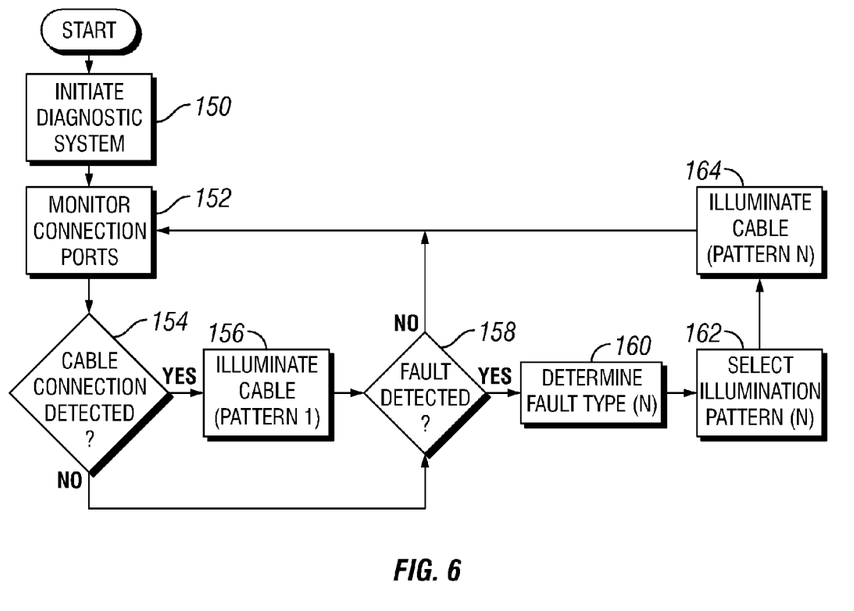
FIG. 6 is a flowchart broadly outlining a method of fault detection in a computer system according to one embodiment of the invention.

FIG. 6 is a flowchart broadly outlining a method of fault detection in a computer system according to one embodiment of the invention. The steps and sequence outlined in the flowchart are non-limiting and non-exhaustive. In step 150, a diagnostic system is initiated. The diagnostic system may be embodied in software run by a subsystem of the computer system being connected, or by another computer. The diagnostic system is optionally initiated prior to any connections being made, as shown, such that any faults that may occur during the connection process may be immediately detected. In step 152, the computer system's connection ports and related components are monitored. In step 154, cable connections are detected. For example, the computer system may detect the connection of one cable connector to one connection port, or the connection of both ends of a cable to establish electronic communication between a connection port of one device and a connection port of another device.

In response to the connection(s) detected in step 154, the associated data cable may be illuminated in step 156 by providing an AC voltage to an electroluminescent strand included with the data cable. A variety of illumination patterns may be created by controlling the AC voltage. Brightness, duration, blinking, blinking rate, and color are non-limiting examples of illumination-related parameters that may be controlled. Each event or condition may be assigned a unique illumination "pattern" or pre-assigned set of illumination parameters, so that a user may readily identify the event or condition according to the illumination pattern. "Pattern 1" may be assigned to the connection of a cable to a connection port. For example, when first plugging in a data cable to a port, the EL strand may be illuminated for a predetermined period of time, such as five seconds. The data cable may include two EL strands, with a first strand extending from one end to an approximate midpoint of the data cable, and a second strand running from the other end to the approximate midpoint of the data cable. Thus, when plugging in one end of the data cable to a first device, one half of the data cable may be illuminated for the predetermined time period. When plugging in the other end of the data cable to a second device, the other half of the data cable may be illuminated for the predetermined time period, or both halves may be simultaneously illuminated to indicate a completed connection between two ports. Such an implementation would probably utilize a power source for the EL strands in both the first and second devices. A number (n) of other illumination patterns may be selected, each assigned to particular fault or fault type.

In step 158, a fault may be detected. In step 160, if a fault was detected, then the fault type is detected. In step 162, an illumination pattern (n) is selected corresponding to the detected fault type. In step 164, the illumination pattern is applied to the data cable associated with the fault in response to the detection of the fault. The monitoring of connection ports and detection of faults may be continued for so long as the diagnostic system is being operated. Desirably, the diagnostic system may be operational any time the computer system is powered on and running. Alternatively, the diagnostic system may be initiated as selected by the user, such as during a setup phase, or during periods of low processor utilization.

As discussed, the invention may take the form of an embodiment containing hardware and software elements. Non-limiting examples of software include firmware, resident software, and microcode. More generally, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W), and DVD.

A data processing system suitable for storing and/or executing program code typically includes at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

Input/output (I/O) devices such as keyboards, displays, or pointing devices can be coupled to the system, either directly or through intervening I/O controllers. Network adapters may also be used to allow the data processing system to couple to other data processing systems or remote printers or storage devices, such as through intervening private or public networks. Modems, cable modems, Ethernet cards, and wireless network adapters are examples of network adapters.

Figure 7:
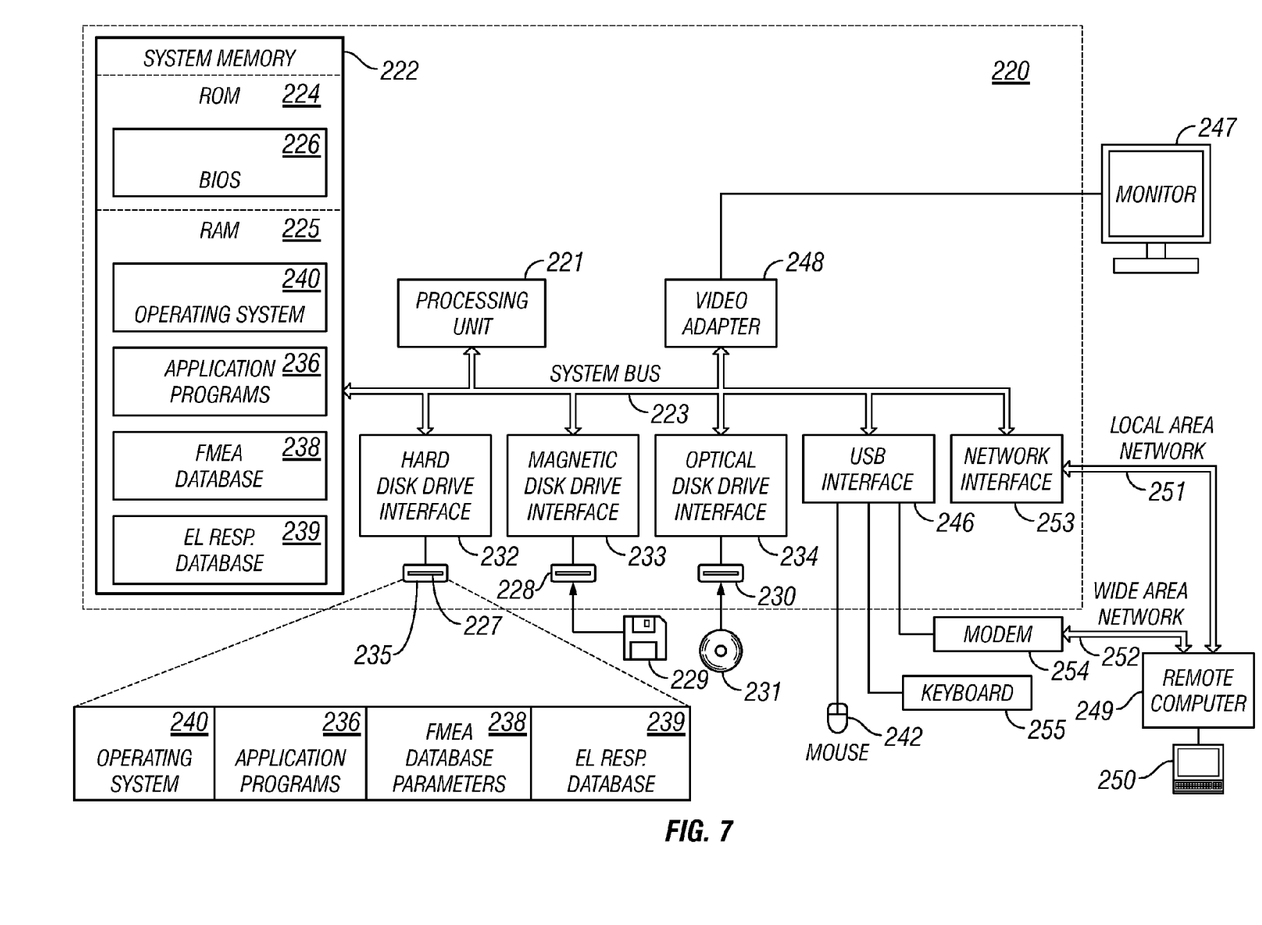
FIG. 7 is a schematic diagram of a computer system that may be configured for troubleshooting connections of the computer system or another computer system according to an embodiment of the invention.

FIG. 7 is a schematic diagram of a computer system generally indicated at 220 that may be configured for troubleshooting connections of the computer system 220 or another computer system according to an embodiment of the invention. For example, the computer system 220 may be a standalone "PC" networked or otherwise connected with other computers or electronic devices. As another example, the computer system 220 may be a subsystem of a rack-mounted computer system having a plurality of servers. Generally, computer system 220 includes a processing unit 221, a system memory 222, and a system bus 223 that couples various system components, including the system memory 222 to processing unit 221. System bus 223 may be any of several types of bus structures including a memory bus or memory controller, a peripheral bus, and a local bus using any of a variety of bus architectures. The system memory includes a read only memory (ROM) 224 and random access memory (RAM) 225. A basic input/output system (BIOS) 226 is stored in ROM 224, containing the basic routines that help to transfer information between elements within computer system 220, such as during start-up.

Computer system 220 further includes a hard disk drive 235 for reading from and writing to a hard disk 227, a magnetic disk drive 228 for reading from or writing to a removable magnetic disk 229, and an optical disk drive 230 for reading from or writing to a removable optical disk 231 such as a CD-R, CD-RW, DV-R, or DV-RW. Hard disk drive 235, magnetic disk drive 228, and optical disk drive 230 are connected to system bus 223 by a hard disk drive interface 232, a magnetic disk drive interface 233, and an optical disk drive interface 234, respectively. Although the exemplary environment described herein employs hard disk 227, removable magnetic disk 229, and removable optical disk 231, it should be appreciated by those skilled in the art that other types of computer readable media which can store data that is accessible by a computer, such as magnetic cassettes, flash memory cards, digital video disks, Bernoulli cartridges, RAMs, ROMs, USB Drives, and the like, may also be used in the exemplary operating environment. The drives and their associated computer readable media provide nonvolatile storage of computer-executable instructions, data structures, program modules, and other data for computer system 220. For example, the operating system 240 and application programs 236 may be stored in the RAM 225 and/or hard disk 227 of the computer system 220.

A user may enter commands and information into computer system 220 through input devices, such as a keyboard 255 and a mouse 242. Other input devices (not shown) may include a microphone, joystick, game pad, touch pad, satellite dish, scanner, or the like. These and other input devices are often connected to processing unit 222 through a USB (universal serial bus) 246 that is coupled to the system bus 223, but may be connected by other interfaces, such as a serial port interface, a parallel port, game port, or the like. A display device 247 may also be connected to system bus 223 via an interface, such as a video adapter 248. In addition to the monitor, personal computers typically include other peripheral output devices (not shown), such as speakers and printers.

The computer system 220 may operate in a networked environment using logical connections to one or more remote computers 249. Remote computer 249 may be another personal computer, a server, a client, a router, a network PC, a peer device, a mainframe, a personal digital assistant, an internet-connected mobile telephone or other common network node. While a remote computer 249 typically includes many or all of the elements described above relative to the computer system 220, only a memory storage device 250 has been illustrated in FIG. 7. The logical connections depicted in the figure include a local area network (LAN) 251 and a wide area network (WAN) 252. Such networking environments are commonplace in offices, enterprise-wide computer networks, intranets, and the internet.

When used in a LAN networking environment, the computer system 220 is often connected to the local area network 251 through a network interface or adapter 253. When used in a WAN networking environment, the computer system 220 typically includes a modem 254 or other means for establishing high-speed communications over WAN 252, such as the internet. Modem 254, which may be internal or external, is connected to system bus 223 via USB interface 246. In a networked environment, program modules depicted relative to computer system 220, or portions thereof, may be stored in the remote memory storage device 250. It will be appreciated that the network connections shown are exemplary and other means of establishing a communications link between the computers may be used.

Program modules may be stored on hard disk 227, optical disk 231, ROM 224, RAM 225, or even magnetic disk 229. The program modules may include portions of an operating system 240, application programs 236, or the like. An FMEA database 238 may be included, which may contain parameters and procedures for troubleshooting connections of the computer system 220 or another computer system. An EL response database 239 may also be included, which may contain parameters and procedures for providing the desired visual response from electroluminescent cables to be illuminated. The EL response database may stipulate various conditions involving the connection ports being diagnosed and a corresponding variety of visual responses to be triggered by the various conditions. For example, plugging in a data cable to a connection port could cause an electroluminescent cable to light up for a predetermined period of time specified in the EL response database 239. As another example, a specific type or category of faults could be identified by a particular illumination pattern assigned to that type or category. For instance, an excessive data transfer rate could be indicated by a rapidly blinking pattern, while an underperforming data transfer rate could be indicated by a comparatively slowly blinking pattern, and these conditions and their visual responses may be controlled by parameters of the EL response database 239.

Aspects of the present invention may be implemented in the form of application program 236. Application program 236 may be informed by or otherwise associated with FMEA database 238 and/or EL response database 239. The application program 236 generally comprises computer-executable instructions for troubleshoot connections of a computer system. The application program 236 may include some aspects of conventional troubleshooting software, along with adaptations suitable for controlling the illumination of data cables having electroluminescent features according to the invention. For example, known software code for detecting faults in data cables generally may be combined with software code for controlling EL cables in response to the detected faults.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus, comprising:
a data cable having a first electronic connector with a first set of electronic terminals and a second electronic connector with a second set of electronic terminals,
a plurality of signal wires each electronically coupling one of the first set of electronic terminals with one of the second set of electronic terminals; and
an electroluminescent strand extending along the data cable between the first and second electronic connectors, the electroluminescent strand including a first wire, an electroluminescent coating on the first wire, and a second wire adjacent the first wire, such that the electroluminescent coating is illuminable in response to an AC voltage between the first and second wires.

2. The apparatus of claim 1, wherein the first wire of the electroluminescent strand is electronically coupled to a first electronic terminal included with the first or second set of electronic terminals and the second wire of the electroluminescent strand is electronically coupled to a second electronic terminal included with the first or second set of electronic terminals.

3. The apparatus of claim 2, further comprising an AC voltage source electronically coupled to the first and second electronic terminals for generating the AC voltage between the first and second wires.

4. The apparatus of claim 3, wherein the AC voltage source comprises:
a DC source; and
an electronic inverter electronically coupled to the DC source for outputting AC in response to the DC source.

5. The apparatus of claim 4, wherein the electronic inverter is disposed on one of the first electronic connector and the second electronic connector.

6. The apparatus of claim 1, further comprising a translucent or transparent cable housing, wherein the electroluminescent strand is disposed in the cable housing.

7. The apparatus of claim 6, wherein the cable housing comprises a color filter for filtering light transmitted from the electroluminescent strand through the cable housing.

8. The apparatus of claim 1, further comprising:
an electronically insulating material disposed within the cable housing for insulating between the plurality of wires and the electroluminescent strand.

9. The apparatus of claim 8, wherein the electronically insulating material is selected from an aluminum foil, mylar foil, tinned copper braid, and combinations thereof.

10. The apparatus of claim 1, wherein the first and second electronic connectors are of a connector type selected from the group consisting of Ethernet, RS-232, video, keyboard/mouse, USB, Infiniband, SAS, SATA, SCSI, and Firewire.

11. A diagnostic system, comprising:
a first electronic component having a first plurality of electronic connection ports;
a second electronic component having a second plurality of electronic connection ports;
a plurality of electronic data cables for providing electronic communication between the first and second electronic components, each electronic data cable having a first electronic connector removably connected to one of the first plurality of electronic connection ports, a second electronic connector removably connected to one of the second plurality of electronic connection ports, a plurality of signal wires disposed in a data cable housing for providing electronic communication between the first and second connection ports, and an electroluminescent strand;
an AC voltage source electronically coupled to the electroluminescent strand for selectively illuminating the electroluminescent strand; and
a controller in electronic communication with the AC voltage source and the electronic connection ports for detecting failure modes associated with one or more of the electronic connection ports and selectively illuminating the electroluminescent strands in response to the detected failure modes.

12. A computer program product including a computer usable medium containing computer program code which, when executed by a computer, causes the computer to troubleshoot connections of a computer system, the computer usable program code including:
computer usable program code for electronically monitoring a plurality of connection ports included with the computer system;
computer usable program code for detecting a fault associated with one or more of the connection ports configured for removably connecting to a data cable, wherein the data cable includes an electroluminescent strand having a first wire with an electroluminescent coating and a second wire in contact with the first wire; and
computer usable program code for selectively applying an AC voltage between the first wire and the second wire to illuminate the electroluminescent coating in response to the detected fault.

13. The computer program product of claim 12, further comprising:
computer usable program code for selectively adjusting the frequency of the AC voltage.

14. The computer program product of claim 12, further comprising:
computer usable program code for selectively applying the AC voltage for a predetermined time period upon detection of the fault.

15. The computer program product of claim 12, further comprising:
computer usable program code for selectively applying the AC voltage for a predetermined time period upon connecting the data cable to one of the connection ports.

* * * * *